INVENTORS
FORBES M. HURLEY and
WILLIAM A. NAULT

By Donald G. Dalton
Attorney

United States Patent Office
3,441,328
Patented Apr. 29, 1969

3,441,328
PRELUBRICATED BEARING SURFACE, AND METHOD OF PREPARING THE SAME
Forbes M. Hurley, 5841 Vermont St. 46409, and William A. Nault, 1721 W. 60th Place 46408, both of Gary, Ind.
Filed Oct. 20, 1966, Ser. No. 588,206
Int. Cl. F16c 27/00, 33/00
U.S. Cl. 308—238       7 Claims

ABSTRACT OF THE DISCLOSURE

A pre-lubricated bearing surface and method of producing the same. The surface includes a plurality of reservoirs, adapted to receive and gradually feed out dry lubricants contained therein. The dry lubricants include a low friction coating, which upon curing forms a hard glossy film. Also, finely divided dry lubricants are dusted onto the coating, while the coating is in a tacky state prior to curing.

---

This invention relates generally to plain-type sleeve bearings for rotating shafts, and other bearing surfaces where similar sliding friction is encountered. It is particularly characterized by its mode of pre-lubrication of such bearing surfaces with dry lubricants, generally suitable for use even at relatively high temperatures without further lubrication attention.

A distinctive feature of the invention is the provision of a multiplicity of small, pocket-type reservoirs, adapted to receive and gradually feed out dry lubricants contained therein. These reservoirs are of a generally oblong structure, in plan view, and are aligned with their major axes obliquely to the direction of travel of surfaces which the bearing supports. The reservoirs are desirably arranged in parallel rows. The bearing surface, as a whole is coated with material adapted to be cured to a low friction, hard, glossy film, which coating is also adapted, before final curing, to present a tacky surface for adherence of conventional dry, finely divided lubricants, such as flake graphite, or equivalent. Additionally, such dry lubricants may be mixed with the underlying coating material, prior to its application. The purpose of the oblique orientation of the reservoirs is to promote a gradual "screw-out" of lubricity agent therefrom.

The invention has special utility in applications where conventional lubrication methods are unsatisfactory, by reason of bearing location, heat, dusty atmosphere, high pressures, etc., such as conditions encoutered, for example, in re-heat furnace discharge tables in steel mills.

The invention will be more fully understood by reference to the drawing and the accompanying description.

Figure 1:
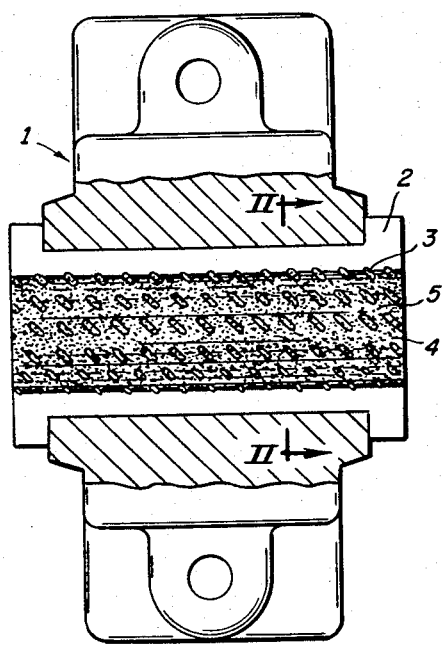
FIGURE 1 is a plan view of half a sleeve bearing incorporating, generally, the reservoirs, underlying coating, and surface dry lubricants of the invention.

More specifically, regarding the drawing, with identical numerals applied to similar parts throughout the figures, in FIGURE 1, bearing cap 1 supports half bearing 2 having reservoirs 3, said bearing carrying coating 4, which, in turn, carries finely divided dry lubricant 5.

Figure 2:
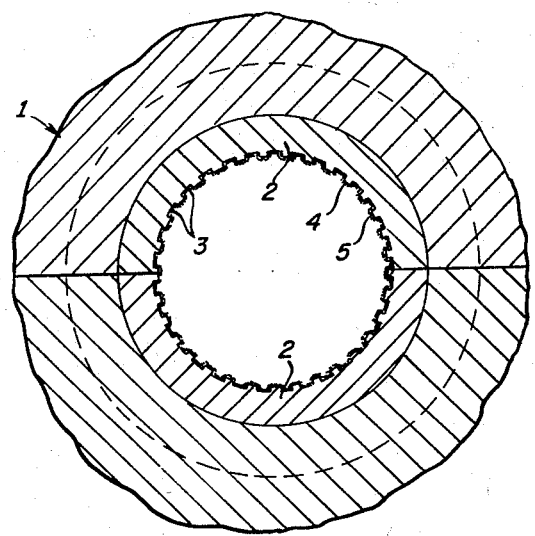
FIGURE 2 is an enlarged cross section taken along the line II—II of FIGURE 1.

FIGURE 2, presenting a cross section of FIGURE 1, emphasizes the reservoir construction, in which the inner surface of bearing 2 carries reservoirs, underlying coating on the entire bearing surface, and a liberal dusting of dry lubricant thereon. In usual practice the reservoirs are initially more nearly filled than depicted.

Figure 3:
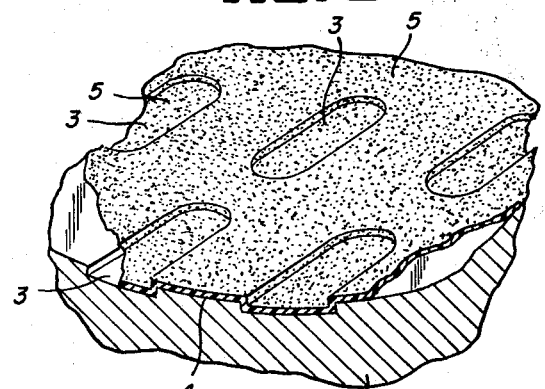
FIGURE 3 is an enlarged perspective view of the general make-up of the bearing surface, absent the usual filling-in of the reservoirs.

FIGURE 3 emphasizes the oblong reservoir 3 construction, as well as showing the basic bearing 2 with coating 4 covering the plain surface of the bearing as well as the reservoirs. Coating 4 has been liberally dusted, while in tacky condition, with a finely divided dry lubricant 5.

Figure 4:
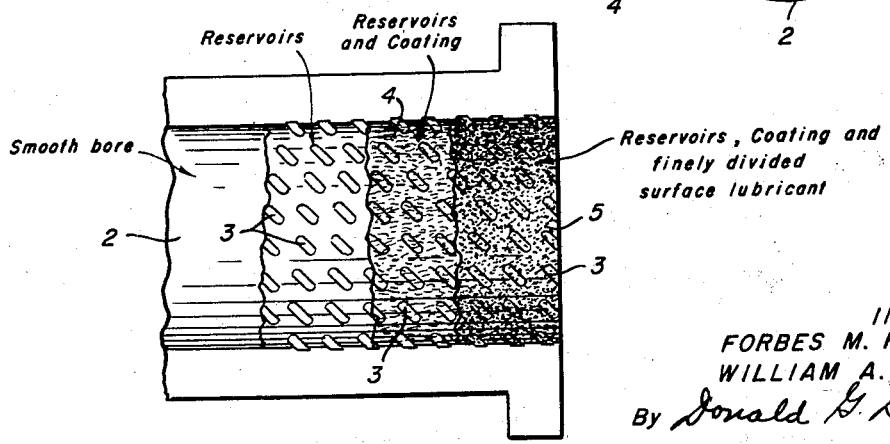
FIGURE 4 is a composite view illustrating one mode of manufacture of a sleeve bearing of the invention.

FIGURE 4 depicts one mode of manufacture of the bearing from a smooth bore of bearing 2, through steps to provide reservoirs 3, coating 4, and finely divided surface lubricant 5.

The bearing material may be SAE 64 bronze, for example, either plain or chrome plated.

The bearing surface is first pattern-etched, or otherwise prepared to form a multiplicity of spaced apart, disconnected, oblong lubricant reservoirs over the entire bearing surface, which reservoirs are preferably arranged in parallel rows which are olique to the direction of travel of surfaces which the bearing supports. Also, to provide complete crosswise lubrication coverage, the reservoirs in successive rows are preferably offset from each other, in relation to the line of travel. The reservoirs are essentially oblong, in plan view, with major axes aligned in row direction.

It has been found that certain materials employed as heat stable release agents, for coating metal patterns, molds, and similar surfaces, have the propensity to achieve an initial tackiness which permits retention of dry lubricant dusted thereon. The coating is applied to the bearing surface, as well as the reservoirs, and dry lubricant, such as graphite, is liberally dusted thereon, and dry lubricant may additionally be incorporated in the fluid coating material.

A coating, for purposes of the invention should be capable of being cured to a hard, glossy film that has an extremely low coefficient of friction.

An example of a suitable coating is Dow Corning R–671 resin, manufactured by Dow Corning, Midland, Mich., and described in their bulletin 07–082, dated August 1963. It is a heat-stable, semi-permanent silicone release agent, adapted to withstand temperatures up to 500° F., and is highly resistant to chemical attack. It is capable of passing through the required tacky stage, and, when cured for about one-half hour at a temperature of approximately 475° F., produces the desired film of low coefficient of friction.

A specific example of employment of the invention involved bearings on rollers of a steel mill re-heat furnace discharge, where the shafts were about 3½ inches in diameter and turning in the order of 100 r.p.m. Here the obliquity of the reservoir rows was about 45° to the bearing axis. The reservoirs employed were in the order of 1/16 inch to ¼ inch long, 1/32 inch to ⅛ inch wide, and 0.005 inch to 0.015 inch deep. The spacing between reservoirs in the same row was approximately ⅛ inch to ¼ inch, and the row-to-row spacing was about ¼ inch to ½ inch. Underlying coating film thickness was about 1 to 5 mills, which film carried an overlying layer of graphite in the order of 1/16 inch.

A design criterion is to produce reservoirs which will permit lubricant to be "screwed-out" of them, while retaining a sufficient supply of lubricant for prolonged bearing life.

It will be appreciated that the size of the reservoirs, as well as the obliquity of their rows, is subject to variation with particular applications, as may readily be determined by one skilled in the art, without departing from the essential teachings of the invention. For instance, relatively large reservoir sizes lend themselves to slower speed. Also, with relatively high speed it may be found advantageous to increase the obliquity of the reservoir axes, with respect to the transverse of the line of travel of surfaces traveling upon said bearing.

Also, various bearing materials, underlying coatings, and dry lubricants, not specifically mentioned, may appear advantageous to those skilled in the art, without departure from the tenor of the invention.

We claim:
1. A pre-lubricated bearing surface comprising:
   (a) said surface provided with a multiplicity of spaced apart, disconnected lubrication reservoirs, receiving a coating and finely divided dry lubricants, said reservoirs being arranged in rows with the reservoirs of successive rows being offset from one another, respecting the direction of traveling surfaces, to provide complete lubrication coverage;
   (b) a dry, low friction resin coating, covering said surface, including the reservoirs, said coating adhesively holding said dry lubricants.
2. The pre-lubricated bearing surface of claim 1 in which the walls of said reservoirs are rounded.
3. The pre-lubricated bearing surface of claim 1 in which said coating is a silicone-type release agent, conventional for metal patterns, molds and other metal surfaces said coating being adapted to adhesively bind a dry, finely divided lubricant, and to be cured to a hard, glossy film having an extremely low coefficient of friction and high heat resistance.
4. The pre-lubricated bearing surface of claim 1 in which said coating has finely divided dry lubricants mixed therewith, prior to application.
5. The pre-lubricated bearing surface of claim 1 in which the dry lubricant is flake graphite.
6. A process for preparing a pre-lubricated bearing surface comprising:
   (a) providing said surface with a multiplicity of spaced apart, generally oblong disconnected lubrication reservoirs adapted to receive dry lubricity materials, said reservoirs having their major axes oriented obliquely to the direction of travel of surfaces which the bearing supports;
   (b) applying a coating to said surface, including the reservoirs, said coating being adapted to initially achieve a tacky surface and to be finally cured to a hard, glossy film;
   (c) dusting said coating, when in tacky condition with finely divided dry lubricant material; and
   (d) curing said coating to a low friction, hard, glossy film.
7. The process of claim 6 in which the reservoirs are arranged in parallel rows which are oblique to the direction of travel of surfaces which the bearing supports, the reservoirs are sufficiently offset, one from the other, respecting direction of traveling surfaces, to provide complete lubrication coverage.

References Cited
UNITED STATES PATENTS

| | | | |
|---|---|---|---|
| 1,581,394 | 4/1926 | Dann | 308—239 |
| 1,422,677 | 7/1922 | Dann | 308—241 X |
| 1,882,956 | 10/1932 | Sandler | 308—240 |
| 2,534,408 | 12/1950 | Bramberry | 308—241 X |
| 2,620,296 | 12/1952 | Wilsdon | 308—240 X |
| 3,089,198 | 5/1963 | Eirhart | 117—33 X |
| 3,264,215 | 8/1966 | Smith et al. | 308—240 |
| 3,342,667 | 9/1967 | Berlinghof | 308—238 X |

EDGAR W. GEOGHEGAN, *Primary Examiner.*

L. L. JOHNSON, *Assistant Examiner.*

U.S. Cl. X.R.

308—239, 240, 241; 117—9, 33